United States Patent [19]

Molitor

[11] 3,896,868

[45] July 29, 1975

[54] RESILIENTLY MOUNTED AUXILIARY WHEEL FOR A TRACTOR

[76] Inventor: Ambrose Leo Molitor, 530 N. Elm St., Sauk Center, Minn. 56378

[22] Filed: Jan. 17, 1974

[21] Appl. No.: 434,245

[52] U.S. Cl. ............... 152/13; 152/93; 152/97; 301/38 S
[51] Int. Cl. ............................................. B60b 1/06
[58] Field of Search ............ 152/13, 14, 15, 16, 17, 152/35, 61, 93, 92, 97, 98, 99, 100, 103, 104, 105, 87, 89, 90; 301/38 R, 38 S, 39 R

[56] References Cited
UNITED STATES PATENTS
1,101,293  6/1914  Kunkel ................................ 152/103
1,673,056  6/1928  Stoltz .................................... 152/93

Primary Examiner—Robert B. Reeves
Assistant Examiner—Larry H. Martin
Attorney, Agent, or Firm—H. Dale Palmatier; James R. Haller

[57] ABSTRACT

An auxiliary wheel for a tractor, the wheel having a hub and a rim with a tire and a series of compression spring supports joining the hub and the rim. The compression spring supports are each oriented with respect to the hub so as to force tangentially of the hub axis, and are oriented with respect to each other to collectively exert a balanced compressive force radially inwardly of the hub to elastically retain the hub coaxially of the rim. The spring supports permit the rim to elastically deviate from its coaxial position with respect to the hub when the auxiliary tire is displaced with respect to the tractor tire, as when the auxiliary tire srikes a rock or the like.

10 Claims, 4 Drawing Figures

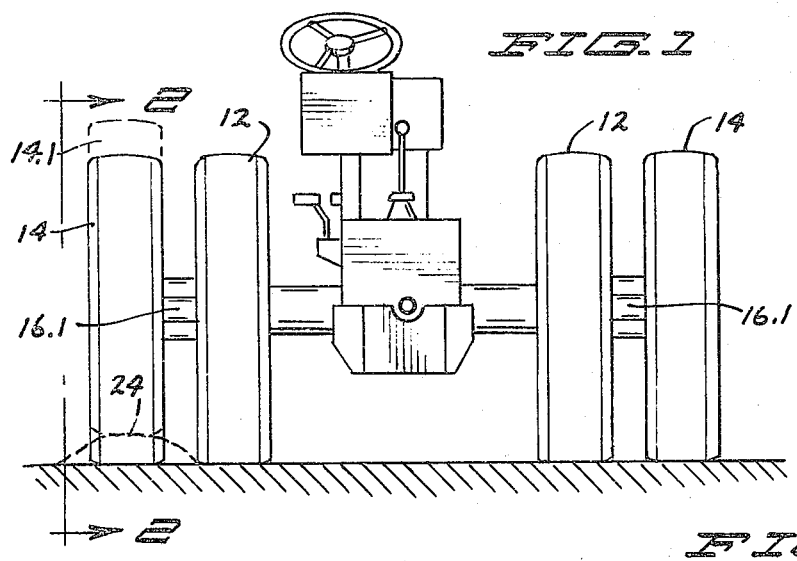
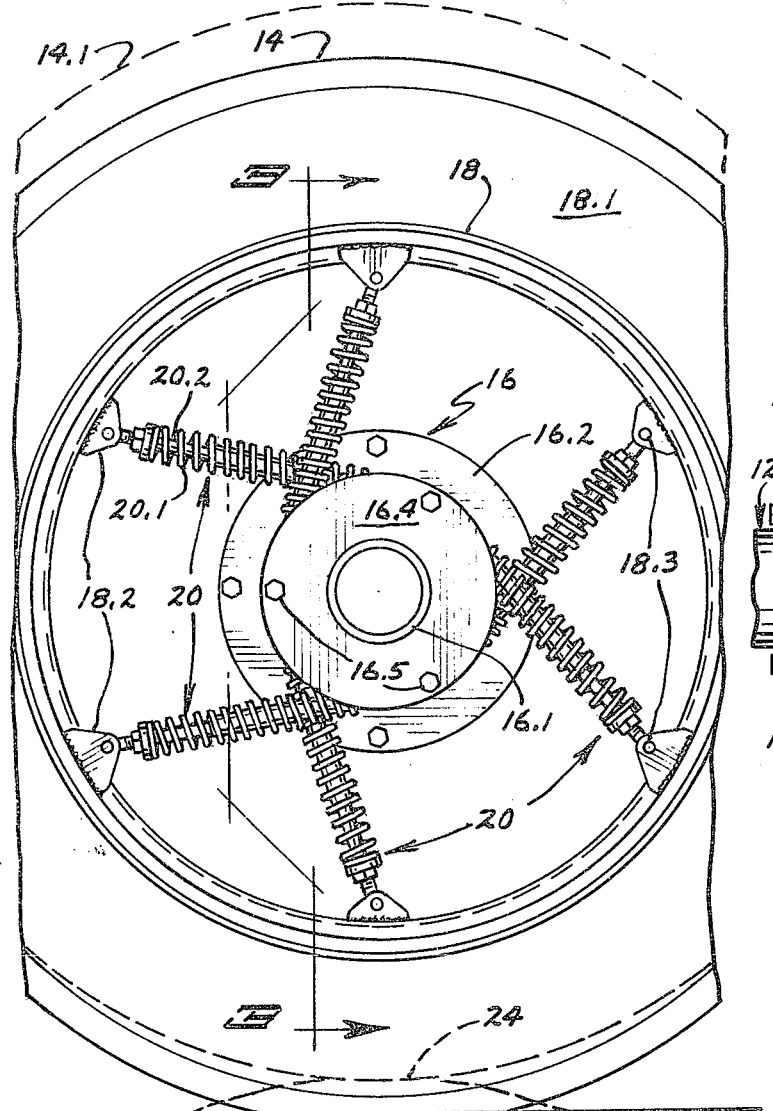
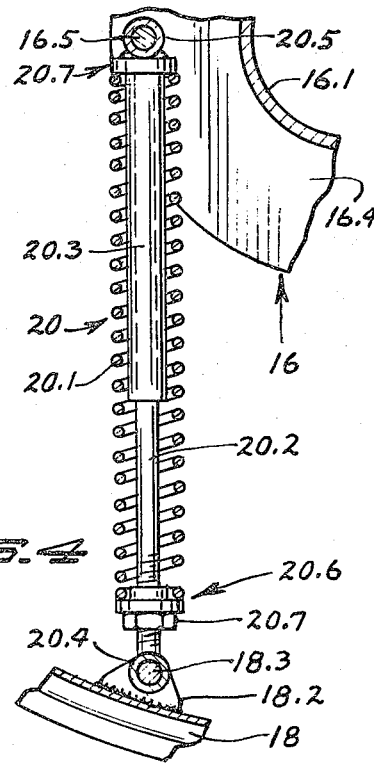
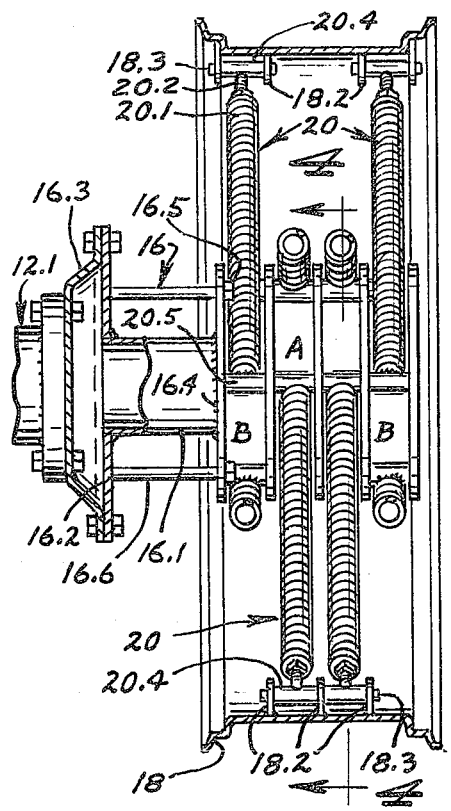

RESILIENTLY MOUNTED AUXILIARY WHEEL FOR A TRACTOR

BACKGROUND OF THE INVENTION

During wet seasons of the year, farm tractors may become easily mired in muddy fields. To avoid this problem, auxiliary wheels have been provided which are rigidly mounted to the outwardly accessible hubs of the tractor drive wheels. The rigid mounting of the auxiliary wheels presents a problem, however, in that when an auxiliary wheel alone, or the tractor wheel to which it is attached, encounters a rise in the ground or a stone or other unevenness, that wheel which encounters the rise in the ground or the like will ride upwardly and will lift the adjacent wheel from the ground, rendering the adjacent wheel at least momentarily useless and placing great strain upon the connection between the auxiliary wheel and the tractor wheel. Auxiliary wheels for a tractor which are free from these problems are greatly to be desired.

BRIEF SUMMARY OF THE INVENTION

The present invention relates to a resiliently mounted auxiliary wheel for a tractor. The wheel comprises a hub axially connectible exteriorly to the hub of a tractor wheel and a rim upon which is mounted an auxiliary tractor tire. A plurality of elongated, elastically compressible supports are held in compression between the hub and the rim, each support being mounted at one end to the rim and at the other end to the hub. The supports are each oriented with respect to the hub so as to apply force to the hub tangentially of the hub axis, and are oriented with respect to each other to collectively exert a balanced compressive force radially inwardly of the hub to elastically retain the hub coaxially of the rim and to permit the hub to elastically deviate from its coaxial orientation when the auxiliary wheel is displaced with respect to the tractor wheel as when one of the wheels strikes a rock or a rise in the ground or the like.

BRIEF DESCRIPTION OF THE DRAWING

In the drawing:

FIG. 1 is a rear elevational view of a tractor equipped with auxiliary wheels of the invention, one of the auxiliary wheels being shown in phantom lines as being elevated with respect to the other wheels;

FIG. 2 is a side elevational view of an auxiliary wheel of the invention shown partially broken away and taken along line 2—2 of FIG. 1;

FIG. 3 is a broken away view shown in partial cross section and taken along line 3—3 of FIG. 2; and FIG. 4 is a broken away view in partial cross section and taken along line 4—4 of FIG. 3.

DETAILED DESCRIPTION OF THE PREFERRED EMBODIMENT

With reference to FIG. 1, a tractor 10 is provided with the usual rear drive wheels 12. To the outwardly accessible hubs of the drive wheels are coaxially mounted auxiliary wheels 14 of the invention. The hub 16 of the auxiliary wheels is provided with an axle 16.1 having an extension which rigidly connects the hub of the auxiliary wheel to the hub of the tractor wheel.

With reference to FIG. 2, the auxiliary wheel 14 includes a rim 18 about which is mounted a rubber tractor tire 18.1. About the inner periphery of the rim are mounted a series of inwardly extending, apertured ears 18.2, and between pairs of ears are connected the ends of elongated, compressible supports 20, which will be more fully described below.

The hub 16 of the auxiliary wheel includes a tubular axle 16.1 which has a radial plate 16.2 at one end adapted to be bolted to a centrally dished plate 16.3 which in turn is bolted to the hub 12.1 of a tractor wheel (FIG. 3). Along the outer surface of the axis 16.1 adjacent its other end are mounted a series of five radially extending, axially spaced, coaxial discs 16.4 defining two outer annular recesses B and two inner annular recesses A. Three axially extending connector pins 16.5 extend through axially aligned holes in the discs, the connector pins being equally spaced circumferentially of the discs and also equally spaced radially from the hub axis. The radially extending mounting plate 16.2 is further rigidified with respect to the axle 16.1 by three connecting dowels 16.6 which extend axially between the mounting plate 16.2 and the nearest adjacent radial disc 16.5, the dowels being equally spaced circumferentially of the mounting plate and adjacent disc. THe inwardly directed ends of the elongated, compressible supports 20 pass into the annular recesses A, B for mounting at their ends to the connector pins 16.5, as will be more fully explained below.

As depicted in FIG. 3, the elongated, compressible supports 20 are separated into pairs of parallel supports. FIGS. 2 and 3 depict six pairs of supports 20 which are mounted at their outer ends to the ears 18.2, the latter being equally spaced about the periphery of the rim 18. The supports 20 extend inwardly for mounting to the connector pins 16.5. Each support pair is angled so as to interleave with another support pair, the supports being symmetrical with respect to a plane passing perpendicularly through the axis of hub 16. The supports of every second support pair mounted about the circumference of the rim are closely adjacent each other and pass into the inner annular recesses A, A of the hub. The supports of the remaining support pairs are spaced from one another by a distance sufficient to permit a pair of the closely adjacent supports to pass between them, and extend into the outer annular recesses B, B of the hub. The supports are held in compression, and each support exerts a compressive force against the hub through its connection to a connector pin 16.4. As shown best in FIG. 3, the forces thus applied to the hub are equally balanced lengthwise of the hub, and there is no resultant overall force tending to twist the rim 18 from its perpendicular orientation with respect to the hub axis.

With reference to FIG. 3, each support which is attached to the rim at a point about the circumference of the rim has a corresponding support which is attached to the rim at a diametrically opposed point, these supports extending inwardly for connection to the hub at points which are circumferentially common but axially spaced with respect to the hub; that is, these supports are attached to the same connector pin but in different, adjacent annular recesses A, B to exert opposing tangential forces. The compressive forces exerted by each support are thus directed tangentially of the hub axis, ie., the forces are directed to points spaced radially from the hub axis. The six pairs of supports thus described cooperate to collectively exert a balanced compressive force radially inwardly of the hub to elastically retain the hub coaxially within the rim.

Referring now to FIG. 4, each elastically compressible support 20 may take the form of a helical spring 20.1 which is internally supported by a telescoping, axially extendible and retractable, stiff support rod comprising telescoping inner and outer tubes 20.2 and 20.3 having sliding, telescoping inner ends. Tube 20.2 extends telescopically into tube 20.3 for a sufficient distance to maintain stiffness between the tubes to support the spring 20.1 against bowing under a compressive load and to permit the spring to extend and retract through a range of at least several inches without separation of the telescoping ends of the tubes. The outwardly extending ends of the tubes 20.2, 20.3 are provided with transverse channels 20.4, 20.5, respectively, the channels 20.5 being of a length permitting them to be received within the annular recesses A, B, of the hub 16, the connector pins 16.5 passing through the channels to pivotally connect the support rods to the hub. The transverse channels 20.4 at the other ends of the support rods are retained between the ears 18.2 extending inwardly from the rim, and are pivotally held between the ears by mounting pins 18.3 passing through the ears and channels.

The spring support rod has a pair of spring seats 20.6, 20.7 spaced along its length, the seats having outwardly extending, confronting annular shoulders confining the compressive spring 20.1 therebetween and also having confronting central projections extending a short distance into the ends of the spring to center the spring ends on the shoulders. As shown in FIG. 4, the transverse channel 20.5 is rigidly affixed as by welding to the spring seat 20.7 which in turn is rigidly connected to the adjacent end of the tube 20.3. At the other end of the spring support rod, the transverse channel 20.4 is rigidly affixed, as by welding, to the outer end of the tube 20.2. A locknut 20.7 is threaded upon a threaded end section of the tube 20.2 and bears inwardly upon the spring seat 20.6, permitting the spring seat to be adjusted axially of the tube to impart varying degrees of compressive stress to the spring 20.1.

To mount the auxiliary wheel 14 to a tractor, the mounting plates 16.2, 16.3 carried by the hub 16 are first affixed by bolts to the hub of the tractor wheel, as shown in FIG. 3. Thereafter, the auxiliary rim 18 with its tire 18.1 is moved into position about the hub, the tire being elevated slightly by being rested on a rock or other ground elevation. In this position, the distance from the hub to the top of the rim is greater than the distance from the hub to the bottom of the rim, and the compressive supports 20 may be fastened between the hub and the top of the rim with comparative ease. The tractor is then driven ahead a short distance so that an adjacent portion of the rim is at the top, the auxiliary wheel again resting upon a slight ground elevation, and further compressive supports are affixed between the top of the tire rim and the hub with comparative ease. This procedure is repeated until each of the spring supports has been attached between the rim and hub. Any adjustments which are thereafter required to properly center the hub 16 coaxially within the rim 18 are readily made by appropriate adjustment of the spring seats 20.6.

In operation, rotation of the hub 16 as the tractor is driven forwardly exerts force to rotate the wheel 18.1 through three of the support pairs 20, whereas when the tractor is driven in reverse, the remaining three support pairs serve to transmit rotational movement of the hub to the tire 18.1. As the auxiliary wheel encounters a rock, a depression or other ground unevenness, the auxiliary wheel follows the uneven ground, the compression supports absorbing the shock of the encounter and permitting the hub 16 of the auxiliary wheel to remain aligned with the axle of the tractor as the tire and rim are displaced with respect to the hub. Both wheels remain in contact with the ground, and both wheels continue to drive the tractor in a forward direction. Likewise, when the inner, or tractor, wheel alone encounters a rock or other ground unevenness, the tractor wheel follows the uneven ground but the auxiliary wheel remains in contact with the ground surface, the compression supports absorbing the shock of the encounter and permitting the rim and tire of the auxiliary wheel to be displaced with respect to the hub. In FIGS. 1 and 2, an auxiliary tire of the invention is shown in dashed lines in an elevated position 14.1 resulting from riding up upon a ground elevation shown in dashed lines as 24, all of the tires remaining in driving contact with the ground.

It may further be noted that the compressive supports of the present invention permit rotational force to be transmitted from the hub to the rim and tire gradually. The hub 16 is able to rotate slightly within the rim against spring pressure; when rotational force is applied to the hub 16, the force is transmitted to the auxiliary tire smoothly and gradually, so that the auxiliary tire does not immediately spin and lose traction in muddy soil in contrast to the tractor wheels to which they are attached.

Manifestly, I have provided a novel and highly useful auxiliary wheel for a tractor which reduces the stress upon the connection between the auxiliary wheel and the tractor wheel to which it is mounted and which enables both the auxiliary wheel and the tractor wheel to remain in driving contact with muddy or slippery, uneven ground.

While I have described a preferred embodiment of the present invention, it should be understood that various changes, adaptations, and modifications may be made therein without departing from the spirit of the invention and the scope of the appended claims.

What is claimed is:

1. Resiliently mounted auxiliary wheel for mounting exteriorly of a tractor wheel and comprising a hub axially connectable to the hub of a tractor tire, a rim upon which is mounted an auxiliary tire, and a plurality of elongated, elastically compressible supports held in compression between the hub and the rim, each support being mounted at one end to the rim and at the other end to the hub and spaced axially along the hub with respect to another support, each support being oriented with respect to the hub to exert force on the hub tangentially of the hub axis, the supports being separated into pairs of coacting parallel supports, the pairs being equally spaced about the circumference of the rim and each support pair being interleaved with another support pair, the supports being oriented with respect to each other to collectively exert a balanced compressive force radially inwardly of the hub and along the axis of the hub to elastically retain the hub coaxially of the rim and permit the hub to elastically deviate from its coaxial orientation, as when the auxiliary tire is displaced with respect to a tractor tire by striking a rock or the like.

2. The auxiliary wheel of claim 1 including at least six elongated, elastically compressible supports each mounted to the hub in tangential orientation to the hub axis, each support having a corresponding support mounted at a diametrically opposed point to the rim, corresponding supports being tangentially mounted to the hub at common circumferential but axially spaced points to exert opposing tangential forces.

3. The auxiliary wheel of claim 1 wherein said supports are symmetrical with respect to a plane perpendicular to the hub axis and collectively exerting a compressive force on the hub free from any resultant force tending to twist the rim from its perpendicular orientation to the hub axis.

4. The auxiliary wheel of claim 3 wherein the supports are separated into six coacting support pairs equally spaced about the circumference of the rim, the supports of each pair being parallel and having ends mounted at circumferentially common, axially spaced points to the rim and to the hub, every second support pair about the circumference of the rim having its supports closely adjacent each other, and the remaining support pairs each having their supports spaced from each other to accomodate between them a pair of closely adjacent supports.

5. The auxiliary wheel of claim 4 wherein each elastically compressible support comprises a helical compression spring, a stiff, telescoping, axially extendible and retractable spring support rod pivotally mounted at its outer end to the rim and hub, respectively, and passing through the compression spring to support the latter, the rod having spaced, confronting compression spring seats for holding the compression spring in compression therebetween, at least one seat being adjustable along the length of the rod for adjusting the degree of spring compression.

6. The auxiliary wheel of claim 5 wherein each spring support rod is threaded at one end and includes a locknut threaded thereon and oriented as to bear inwardly against a compression spring seat, whereby the position of the compression spring seat along the rod may be adjusted by rotation of the locknut.

7. The auxiliary wheel of claim 6 wherein each end of the spring support rod terminates in a channel transverse to the axis of the rod, and wherein the hub includes an axle having a plurality of radially extending, axially spaced discs thereon defining four annular, spring-receiving channels, the hub including three axially extending connector rods extending through the discs and equally spaced circumferentially of the discs, each pin passing through the transverse channels at the ends of two pairs of supports mounted at diametrically opposed points to the rim, the rim having inwardly extending, apertured ears receiving between them the transverse channels at the other ends of the supports and including mounting pins passing through and pivotally connecting the apertured ears and the transverse channels.

8. A resiliently mounted auxiliary wheel for mounting exteriorly of a tractor wheel and comprising a hub having an axially spaced flange connectible to the hub of a tractor wheel, the hub having five radially-extending, axially spaced coaxial discs providing two inner and two outer annular spaces about the hub and having three axially-extending connector pins equally spaced circumferentially of the hub and passing through the discs; six pairs of compression spring supports, the pairs being respectively pivotally mounted at one end to the rim at six equally spaced points about its circumference and at the other end to the hub connector pins, spring support pairs which are mounted to the rim at diametrically opposed points being mounted to a common connector pin, and every other spring support pair about the rim circumference being mounted to the connector pins within the inner annular spaces and the remaining support pairs being mounted to the pins within the outer annular spaces; each spring support comprising a helical compression spring, a telescoping, axially extendible and retractable spring support rod pivotally mounted at its ends to the hub and rim respectively and passing through the compression spring, the rod having spaced, confronting compression spring seats for holding the spring in compression therebetween, at least one of the seats being adjustable along the length of the rod for adjusting the degree of spring compression.

9. A resiliently mounted wheel comprising a hub, a rim upon which is mounted a tire, and a plurality of elongated, elastically compressible pairs of parallel supports mounted in compression between the hub and the rim and supporting the rim on the hub, the support pairs being equally spaced about the circumference of the rim and oriented with respect to the hub to exert force on the hub tangentially of the hub axis and to collectively exert a balanced compressive force radially inwardly of the hub, the supports of each pair having ends mounted at circumferentially common, axially spaced points to the rim and having their other ends mounted to circumferentially common, axially spaced points to the hub, every second support pair about the circumference of the rim having its supports closely adjacent each other, and the remaining support pairs each having their supports spaced from each other to accommodate between them a pair of closely adjacent supports.

10. The wheel of claim 9 wherein the hub includes radially outwardly extending, axially spaced coaxial discs extending between supports mounted to the hub and spaced axially from one another.

* * * * *